United States Patent
Kawai et al.

(10) Patent No.: US 6,767,386 B2
(45) Date of Patent: Jul. 27, 2004

(54) METHOD AND APPARATUS FOR PRODUCING NITROGEN

(75) Inventors: Masato Kawai, Tokyo (JP); Akihiro Nakamura, Tokyo (JP); Masayoshi Hayashida, Tokyo (JP); Yoshinori Watanabe, Tokyo (JP); Shinichi Marumo, Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 10/064,753

(22) Filed: Aug. 14, 2002

(65) Prior Publication Data

US 2003/0097931 A1 May 29, 2003

(30) Foreign Application Priority Data

Sep. 5, 2001 (JP) ........................................ 2001-269010

(51) Int. Cl.⁷ ............................................. B01D 53/053
(52) U.S. Cl. ................. 95/98; 95/100; 95/119; 95/138; 95/903; 96/108; 96/130; 96/143
(58) Field of Search ........................ 95/98, 100, 105, 95/117–119, 138, 903; 96/108, 130, 143, 144

(56) References Cited

U.S. PATENT DOCUMENTS

| | | | | |
|---|---|---|---|---|
| 4,264,339 A | * | 4/1981 | Juntgen et al. ............... | 95/96 |
| 4,415,340 A | * | 11/1983 | Knoblauch et al. ............ | 95/96 |
| 4,572,723 A | * | 2/1986 | Ward .......................... | 95/96 |
| 4,627,857 A | * | 12/1986 | Sutt, Jr. ...................... | 95/128 |
| 4,629,476 A | * | 12/1986 | Sutt, Jr. ...................... | 95/138 |
| 4,742,040 A | * | 5/1988 | Ohsaki et al. ............... | 502/426 |
| 4,790,859 A | * | 12/1988 | Marumo et al. .............. | 95/138 |
| 4,925,461 A | * | 5/1990 | Gemba et al. ................ | 95/98 |
| 4,931,071 A | * | 6/1990 | Kaplan et al. ................ | 95/96 |
| 4,933,314 A | * | 6/1990 | Marumo et al. ............. | 502/416 |
| 4,959,083 A | * | 9/1990 | Garrett ........................ | 95/98 |
| 5,098,880 A | * | 3/1992 | Gaffney et al. ............. | 502/432 |
| 5,108,467 A | * | 4/1992 | Schroter et al. .............. | 95/103 |
| 5,164,355 A | * | 11/1992 | Farris et al. ................ | 502/420 |
| 5,176,722 A | * | 1/1993 | Lemcoff et al. ............. | 95/102 |
| 5,240,474 A | * | 8/1993 | Auvil et al. .................. | 95/96 |
| 5,248,651 A | * | 9/1993 | Henning et al. ............ | 502/432 |
| 5,258,056 A | * | 11/1993 | Shirley et al. ................ | 95/22 |
| 5,275,640 A | * | 1/1994 | Schroter et al. ............. | 95/101 |
| 5,294,585 A | * | 3/1994 | Moreau et al. ............. | 502/413 |
| 5,346,536 A | * | 9/1994 | Kaneshige et al. ........... | 95/103 |
| 5,382,280 A | * | 1/1995 | Choe et al. ................... | 95/98 |
| 5,411,577 A | * | 5/1995 | Moreau et al. ............... | 95/96 |
| 5,441,558 A | * | 8/1995 | Lee et al. .................... | 95/100 |
| 5,447,557 A | * | 9/1995 | Golden et al. ................ | 95/96 |
| 5,505,765 A | * | 4/1996 | Kaji et al. .................... | 95/100 |

* cited by examiner

Primary Examiner—Robert H. Spitzer
(74) Attorney, Agent, or Firm—Jiang Chyun IP Office

(57) ABSTRACT

CMS adsorbents having suitable indexes are used to improve greatly the performance of nitrogen-producing apparatuses where nitrogen is obtained from the air with a PSA method, so as to improve the efficiency of nitrogen production. A nitrogen PSA apparatus is formed with two adsorbing columns where an adsorption step and a regeneration step are performed alternatively and periodically. The adsorption step is for adsorbing oxygen and conducting nitrogen to a product tank with the supply of compressed air from an air compressor, and the regeneration step for releasing the adsorbed gas after the adsorption step. The adsorbing columns are filled with a carbon molecular sieve (CMS) that selectively adsorbs oxygen as an adsorbent. The CMS adsorbs an oxygen/nitrogen amount of 50% of the saturated adsorption amount with a period TO/TN starting from oxygen/nitrogen supply, wherein TO is 5~10 seconds and TN is larger than TO by more than 41 times.

4 Claims, 2 Drawing Sheets

METHOD AND APPARATUS FOR PRODUCING NITROGEN

CROSS REFERENCE TO RELATED APPLICATIONS

This application claims the priority benefit of Japanese application serial no. 2001-269010 filed on Sep. 5, 2001.

BACKGROUND OF INVENTION

1. Field of Invention

The present invention relates to a method for producing nitrogen by using a pressure swing adsorption (PSA) method with the air as a raw material, wherein a carbon molecular sieve (CMS) is particularly used as an adsorbent in order to produce high purity nitrogen gas. More particularly, the present invention relates to a method and an apparatus for producing nitrogen with a PSA method that uses a CMS adsorbent having suitable adsorption properties as evaluated with an index, which is for evaluating the gas separating ability of the adsorbent required for improving the performance of nitrogen production with PSA.

2. Description of Related Art

In recent years, regarding the methods for producing nitrogen, a method that uses an adsorbent preferentially adsorbing oxygen to produce high purity nitrogen gas from a gas mixture of oxygen and nitrogen, such as the air, with a PSA method has been widely adopted. The carbon molecular sieve (CMS), as its name indicates, is an activated carbon that has the function of molecular sieving, and features with a smaller mean pore size and a sharper pore size distribution as compared with general activated carbon. Since the pore size of CMS is very close to the molecular size of the adsorbate, the adsorption rates are lower for certain adsorbent/adsorbate combinations. For example, in the case that a nitrogen-rich gas is obtained from a gas mixture of oxygen and nitrogen like the air, the CMS preferably has an adsorption rate for nitrogen much lower than that for oxygen because of the difference between the molecular sizes of oxygen and nitrogen.

A PSA method comprises the following steps. In an adsorption step wherein a raw gas is compressed under a proper pressure and then introduced into an adsorbing column formed with an adsorbent filling layer therein, the easy to adsorb component is adsorbed preferentialy and the difficult to adsorb component is collected as a product. When the adsorbent is saturated with the easy to adsorb component after the adsorption step is performed for a certain period, the raw gas supplied into the adsorbing column formed with the adsorbent layer therein in the adsorption step is switched off. The adsorbing column is opened to the atmosphere to lower the pressure in the column to the atmospheric pressure, so as to desorb the easy to adsorb component from the adsorbent for the regeneration of the adsorbent. By applying the above operation from a single column to a plurality of columns with the adsorption step and the regeneration step being repeated periodically, the product is obtained continuously.

Similarly, a pressurization step, an adsorption step, a depressurization step and a regeneration step are performed sequentially in an apparatus that uses CMS as an adsorbent and utilizes the phenomenon that an adsorption rate for nitrogen is much smaller than that for oxygen, i.e., utilizes the difference between the adsorption rates of the two, to produce nitrogen from an $O_2/N_2$ mixture gas such as the air.

Generally, the process includes the exchange of gases between two adsorbing columns during the switch from the adsorption step to the depressurization step, and during the switch from the regeneration step to the pressurization step. Such an operation is called a "pressure equalizing operation between two columns".

To improve the performance of a nitrogen PSA apparatus, many techniques are disclosed focusing on both the adsorbent and the PSA process itself. The correlation between the adsorbent and the nitrogen PSA apparatus is disclosed in Japanese Patent Publication No. Sho 54-17595, wherein the nitrogen PSA operation uses a coke molecular sieve obtained by introducing a hydrocarbon and decomposing it with pyrolysis to release carbon, and depositing the released carbon in the pores of coke. The nitrogen PSA operation features that a raw gas is introduced with a flow-through rate of 0.01~0.04 $Nm^3$ per second with 1 $m^3$ of the coke molecular sieve.

Moreover, Japanese Patent Application Laid Open No. Sho 59-45914 relates to a method for fabricating a CMS used in a nitrogen PSA apparatus. The document discloses that an oxygen adsorption amount higher than 5 mL/g at equilibrium and a selectivity higher than 20~23 are preferable as being the necessary performances the adsorbent should have for effectively separating oxygen and nitrogen in the PSA process. The above values of selectivity are obtained by measuring the time needed for the sample to adsorb nitrogen to the same amount as the oxygen amount being adsorbed under 1 atm and 25° C. for 5 seconds, and then taking the ratio of the two adsorption times, wherein the sample is kept in vacuum before adsorption. However, nothing is mentioned about the ranges of the adsorption rates for oxygen and nitrogen with the produced CMS in this application.

On the other hand, Japanese Patent Application Laid Open No. Sho 59-182215 discloses a CMS having a mean effective pore size of about 3~20 Å, a required range of oxygen diffusibility and the selectivity ratio for oxygen adsorption and nitrogen adsorption. However, the range of the mean effective pore size is quite broad and the pore size suitable for separating oxygen and nitrogen is not clear in this application. Moreover, the validity of the oxygen diffusibility disclosed in the application cannot be judged because the results of using the nitrogen PSA apparatus are not described.

Japanese Patent Application Laid Open No. Hei 3-232515 describes the use of a CMS that has adsorption amounts of 20~27 mg/g and 1~6 mg/g for oxygen and nitrogen, respectively, under an adsorption pressure of 245 kPa (gauge pressure) after 1 minute, and has an adsorption amount of 22~34 mg/g for the two at equilibrium. The application also disclosed that the adsorption time in the high-pressure adsorption step is 130~300 seconds and the outflow rate (L/min) of the nitrogen product is 0.1~3.0 times the volume (L) of the adsorbing column in the PSA operation. In this application, the properties of the used adsorbent and the limitation of the range of the ratio of "the product outflow rate to the volume of the adsorbing column", which is the characteristic value of the PSA operation, are decided according to the concentration of the oxygen gas contained in the nitrogen product.

As described in the aforementioned prior art, many techniques are disclosed about the CMS adsorbent and the PSA process relating to a nitrogen PSA apparatus. The factors suitably indicating the properties of a CMS adsorbent, including the adsorbed amounts of oxygen and nitrogen at equilibrium and the ratio thereof, the adsorption rates for oxygen and nitrogen and the ratio thereof, and the adsorption times for oxygen and nitrogen and the ratio thereof, are proposed. However, no established evaluating method and indicator have been obtained so far and some problems have consequently occurred. Moreover, some market requirements, such as further miniaturization (compactification) of the nitrogen PSA apparatus and high purity (>99.99%) of the product, are not sufficiently satisfied in practice.

SUMMARY OF INVENTION

In view of the aforementioned issues, this invention provides a new indicator capable of indicating the performance of a CMS. This invention also provides a PSA method that greatly improves the performance of the conventional nitrogen-producing apparatuses within a wide purity range of the nitrogen product from 99% to 99.999% by using a CMS adsorbent having a suitable performance index.

To solve the aforementioned issues, this invention provides a method for producing nitrogen by using a pressure swing adsorption (PSA) method with the air as a raw material, wherein the adsorbent used is a carbon molecular sieve (CMS) for selectively adsorbing oxygen. The time "TO" needed for the CMS to adsorb an oxygen amount of 50% of the saturated oxygen adsorption amount starting from oxygen supply is 5~10 seconds. The time "TN" needed for the CMS to adsorb a nitrogen amount of 50% of the saturated nitrogen adsorption amount starting from nitrogen supply is larger than TO by more than 41 times. The air is made to contact with the CMS and a pressure swing adsorption (PSA) process is performed to produce nitrogen. The method is operated in a state such that the production rate of nitrogen with one ton of adsorbent is higher than 100 $Nm^3/h$(our), 150 $Nm^3/h$ or 250 $Nm^3/h$ as the oxygen concentration in the nitrogen product is 100 ppm, 1000 ppm or 10000 ppm, wherein the oxygen concentration serves as a purity indicator of the nitrogen product. Meanwhile, the method is operated in a state such that the processing rate of the raw air with one ton of adsorbent is lower than 500 $Nm^3/h$, 570 $Nm^3/h$ or 690 $Nm^3/h$ as the oxygen concentration in the nitrogen gas product is 100 ppm, 1000 ppm or 10000 ppm, wherein the oxygen concentration serves as a purity indicator of the nitrogen product.

The apparatus for producing nitrogen of this invention comprises an air compressor, a dryer, at least one adsorbing column and a product tank. The air compressor is used to compress the air and the dryer to remove water from the compressed air. The adsorbing column is filled with an adsorbent capable of selectively adsorbing oxygen, while the compressed air is introduced into the adsorbing column for selective adsorption of oxygen after water is removed. The product tank is used to temporarily store the nitrogen product conducted out of the adsorbing column after oxygen is removed in the adsorbing column. In the adsorbing column, an adsorption step and a depressurization regeneration step are alternatively and periodically switched to implement a pressure swing adsorption (PSA) process. The adsorption step comprises compressively introducing the raw air into the adsorbing column, and the depressurization regeneration step comprises releasing the pressurized gas in the adsorbing column after the adsorption step. The adsorbent is a carbon molecular sieve (CMS) capable of selectively adsorbing oxygen, which adsorbs an oxygen amount of 50% of the saturated oxygen adsorption amount with a period "TO" of 5~10 seconds starting from oxygen supply, and adsorbs a nitrogen amount of 50% of the saturated nitrogen adsorption amount with a period "TN" larger than TO by more than 41 times starting from nitrogen supply.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 plots the pressure decay with time caused by adsorption with the CMS adsorbent.

DETAILED DESCRIPTION

This invention uses a carbon molecular sieve (CMS) that selectively adsorbs oxygen as an adsorbent to produce nitrogen from the raw air with a pressure swing adsorption (PSA) method. An indicator suitably indicating the properties of the carbon molecular sieve, and the correlation between the indicator and the nitrogen-apparatus are obtained in this invention.

<Property Indicator of Adsorbents of This Invention>

The properties of CMS, namely the adsorption rate and the separating ratio, have been considered in the prior art, while one example is described in "Extended Abstracts, International Symposium on Carbon: New Processing and New Application, 1982, p.438, FIG. 5". As described in the article, when the diffusion coefficient of oxygen is larger (i.e., the oxygen adsorption rate is larger), the ratio of the diffusion coefficients of oxygen and nitrogen, namely the separating ratio, is smaller. The correlation itself is still effective as being a fundamental principle since when the performances of the commercially available CMS and the CMS fabricated in this invention are compared, similar ranges of separating ratio are observed within the adsorption rate range of CMS used in nitrogen PSA. Moreover, inspecting the CMS used in conventional PSA methods confirms that the adsorption rate is under a specific value. This can be generalized to a rule with the aforementioned references that a separating ratio over a certain value is a requirement for the PSA method.

In order to specify the measured values that relate to the adsorption rates serving as property indexes of the CMS in this invention, the measuring method is specified at first. The apparatus for measuring the adsorbed amounts is Belsoap 28 manufactured by BELL JAPAN KK., which is commercially available and is widely used. The apparatus applies the so-called constant volume adsorption method to measure the adsorbed amounts, in which the gas is supplied stepwise to the regenerated adsorbent. By measuring the pressure variation in the system starting from the gas supply during the process, the adsorption rate can be measured.

Figure 1:
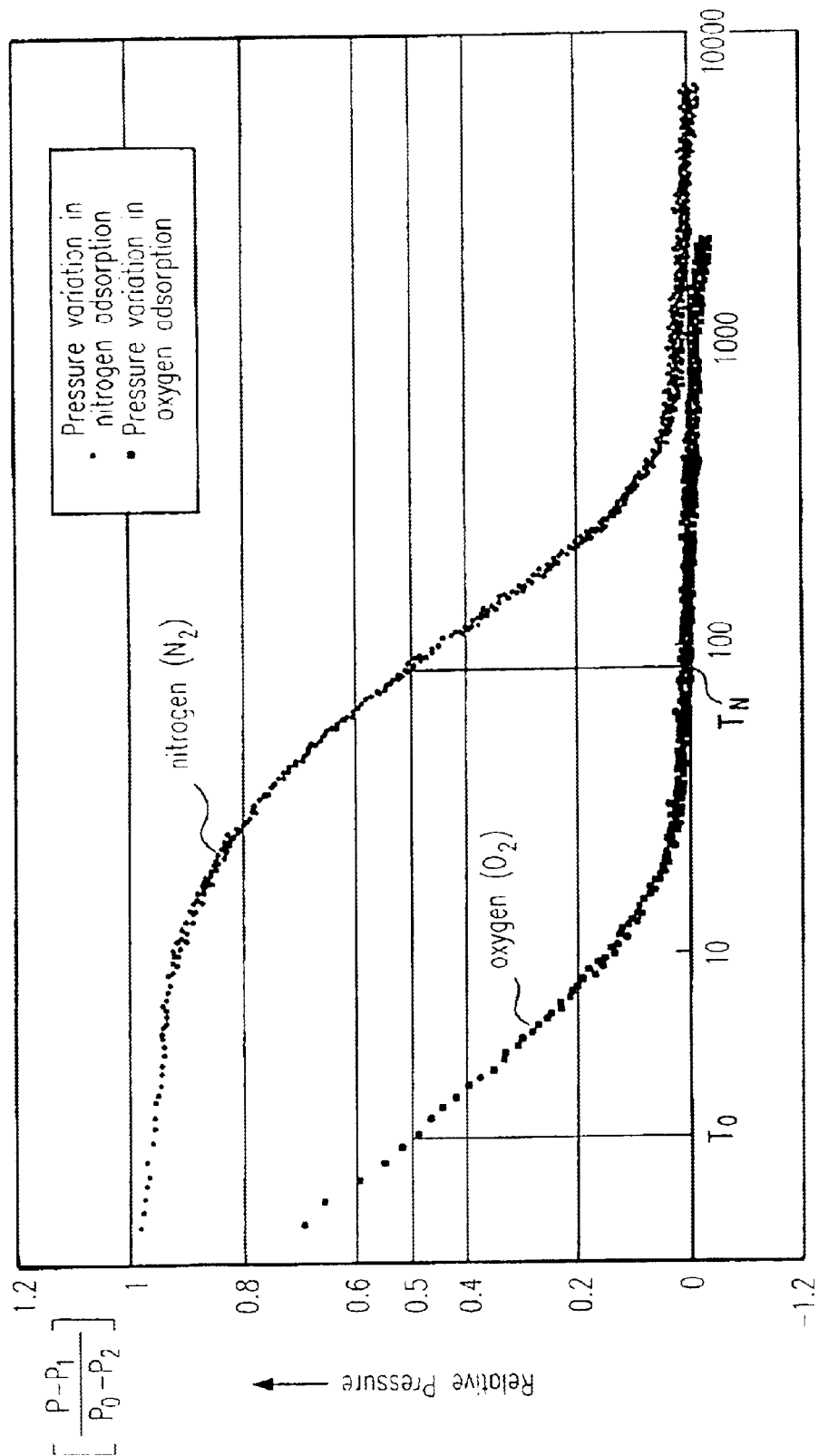

An example of the pressure variation curves measured with Belsoap 28 is plotted in FIG. 1. The transverse axis of FIG. 1 represents the time (second) and the vertical axis represents the pressure variation ratio "(p P2)/(p0 P2)". The ratio takes the pressure "P2" at equilibrium into account for the pressure "p" at a time point with the difference between the initial pressure "p0" and the pressure "P2" at equilibrium as a base value.

Generally, a pressure variation curve with adsorption is approximately point symmetric to the point at the middle pressure, which is between the initial pressure and the pressure at equilibrium and is equal to one half of the difference between the initial pressure and the pressure at equilibrium. When a theoretical curve based on the adsorption theorem is used to fit the experimental data to derive the mass transfer coefficient, the adsorption amounts around 50% of the adsorbed amount at equilibrium are mainly used. The comparison of the magnitudes of the mass transfer coefficients serving as indicators of the adsorption rates is considered most quantitative. However, since the theoretical curve cannot completely fit the experimental data, the derived mass transfer coefficient cannot be considered correct. Therefore, it is simple to use "the time TO/TN needed to adsorb 50% of the adsorbed amount at equilibrium starting from the oxygen/nitrogen supply when the oxygen or nitrogen gas is supplied from a gas cylinder to the regenerated CMS (kept under vacuum before adsorption) for adsorption" as the indicator of the adsorption rate for comparison. Another advantage is that the property index can be obtained without the interference of individual errors.

<Preparation of Adsorbents Having Adsorption Property Indexes of This Invention>

Carbon molecular sieves (CMS) having various adsorption rates are obtained from commercial products or fabricated experimentally. The fabricating method of the raw material of CMS, the activated carbon, is not particularly restricted in this invention. This invention can use dry-distilled carbon produced from coconut shells as the raw material of CMS based on the technique disclosed in JP 2995495. A selection for the characteristics of the activated carbon materials is done with the adsorbed benzene amount as an indicator. The adsorbed benzene amount is measured by using the so-called gas flow method, wherein benzene vapor is carried with a nitrogen flow to be adsorbed by the activated carbon at 25° C. The activated carbon materials having benzene adsorption amounts of 0.05~0.12 g/g are suitable raw materials. It is considered that a larger adsorption amount implies that the pore sizes are larger; while a smaller adsorption amount implies that the pores having a size enough for passing benzene are fewer, i.e., the smaller size pores are greater.

The method for producing CMS from an activated carbon material refers to Japanese Patent Publication No. Sho 54-17595, in which a nitrogen gas flow containing benzene of 2% is heated and conducted onto the activated carbon material kept in a furnace, wherein the temperature for pyrolyzing benzene is chosen to be 700~750° C. By adjusting the deposition time of pyrolyzing-produced carbon on the activated carbon material, the CMS adsorbents having high adsorption rates and those having low adsorption rates are fabricated.

The reasons that the adsorbed amount of benzene is taken as an indicator on the selection of the activated carbon materials are as follows. When the activated carbon having larger pore sizes is used for CMS fabrication, the treating time for converting the activated carbon to CMS becomes longer and the conversion is easily affected by outer interference. Consequently, it is difficult to form a CMS with a uniform pore size and the required separating ratio cannot be acquired. On the other hand, when the pore sizes of the activated carbon material shift to smaller ones, the time needed for converting the activated carbon to CMS is shorter and there are differences between the easy to deposit regions and the difficult to deposit regions. Therefore, it tends to be difficult to fabricate a CMS having a uniform adsorption rate.

Under the aforementioned conditions, some carbon molecular sieves (CMS) are prepared by depositing the carbon produced by benzene pyrolysis onto the activated carbon material. By adjusting the treating time of carbon deposition, six CMS adsorbents having different times for adsorbing an amount of 50% of the adsorbed amount at equilibrium (i.e., different adsorption rates) are fabricated experimentally, including CMS-A, CMS-B, CMS-C, CMS-D, CMS-E and CMS-F. For these CMS adsorbents, the time "TO" needed to adsorb an oxygen amount of 50% of the adsorbed amount of oxygen at equilibrium, the time "TN" needed to adsorb a nitrogen amount of 50% of the adsorbed amount of nitrogen at equilibrium, and the ratio (separating ratio) "TN/TO" are listed in Table 1. The CMS is used to adsorb the gas at 25° C. under an initial pressure of 26.7 kPa (absolute pressure) in the commercially available apparatus "Belsoap 28" for measuring the adsorbed amounts. The gas is introduced under specific measuring conditions, including an adsorption temperature of 25° C. and an initial pressure of 26.7 kPa (absolute pressure). The values measured with the adsorption amount measuring apparatus, Belsoap 28, are listed in Table 1.

TABLE 1

| Adsorbent | TO for oxygen [second] | TN for nitrogen [second] | TN/TO [-] |
|---|---|---|---|
| CMS-A | 13.7 | 580 | 42 |
| CMS-B | 11 | 460 | 42 |
| CMS-C | 9.6 | 420 | 44 |
| CMS-D | 8.2 | 325 | 40 |
| CMS-E | 6.8 | 285 | 42 |
| CMS-F | 5.8 | 210 | 36 |

<Correlation between Nitrogen Purity and Nitrogen-Collecting Rate with PSA Nitrogen-Producing Apparatus and Operating Conditions>

The nitrogen PSA process essentially consists of an adsorption step conducted under a relatively high pressure and a regeneration step under a relatively low pressure. Meanwhile, a pressurizing operation is included for raising the pressure from that of the regeneration step to the adsorption pressure, and a depressurizing operation is included for lowering the pressure from that of the adsorption step to that of the regeneration step. Moreover, a pressure equalizing operation is included, in which some of the adsorbing columns conducting the pressurizing operation and those conducting the depressurizing operation are connected. Thus, the gas in the columns of the adsorption step having high pressure can be recycled by the columns of the regeneration step having low pressure.

Figure 2:
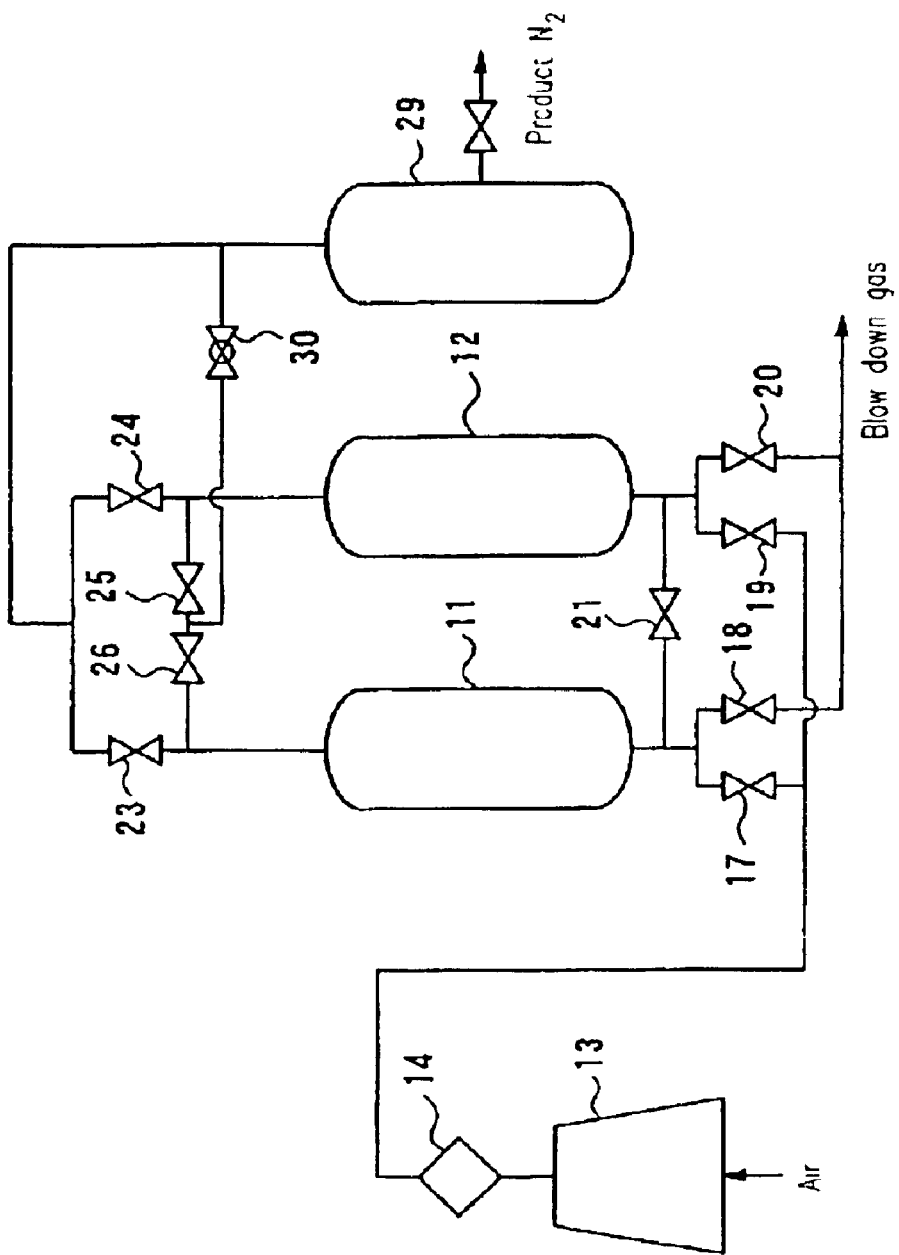
FIG. 2 illustrates a schematic view of an example of the nitrogen PSA apparatus according to this invention.

In the case that two adsorbing columns are used, generally, when an adsorption step is performed in one column, a regeneration step is performed in the other. Therefore, by alternatively and periodically switching the adsorption step and the regeneration step, the product is obtained continuously. A schematic diagram of a nitrogen PSA apparatus of this invention is illustrated in FIG. 2 for explaining the nitrogen-producing method of this invention. At first, the raw air is compressed to a predetermined pressure, such as a maximal pressure of 786 kPa (gauge pressure), by using an air compressor 13, and then supplied to adsorbing columns 11 and 12 through an air dryer 14. The adsorbing columns 11 and 12 are filled with CMS.

When an adsorption step is performed in the adsorbing column 11 and a regeneration step is performed in the adsorbing column 12, the raw air is supplied to the adsorbing column 11 through the valve 17 after being compressed by the air compressor 13 and conducted through the air dryer 14 to be dried with water removal. The compressed raw air supplied into the adsorbing column 11 contacts with the CMS filled in the adsorbing column 11, wherein the oxygen is selectively adsorbed and removed. Nitrogen that is more difficult to adsorb as compared with oxygen is collected from the valve 23 and stored in the product tank 29 before being supplied to users.

On the other hand, in the adsorbing column 12 under the regeneration step, the valve 20 is opened to release the gas therein into the atmosphere to lower the pressure in the adsorbing column 12 and desorb the adsorbed oxygen. Meanwhile, a portion of the nitrogen product is supplied to the adsorbing column 12 through a valve 30 and a valve 25 to purge the oxygen-rich gas remaining in the adsorbing column 12.

When the adsorption step in the adsorbing column 11 and the regeneration step in the adsorbing column 12 are finished, the valves 17, 18, 19, 20, 23 and 24 are closed and the valves 21, 25 and 26 are opened. Thus, the gas remaining in the adsorbing column 11 at the end of the adsorption step is recycled by the adsorbing column 12 that has a low pressure after the regeneration step. Such an operation is called a "pressure equalizing operation", by which the pressure in the adsorbing column 11 is equalized/lowered and that in the adsorbing column 12 is equalized/raised. When the adsorption step is finished, the pressure in the adsorbing column is somewhat lower than the output pressure of the air compressor because of the pressure loss caused by the adsorbent filling layer and the pipeline. The pressure is lowered to, for example, 637 kPa (gauge pressure) and the pressure in the regeneration step, which is conducted under the atmosphere, is 0 kPa (gauge pressure). Therefore, the pressures in the two connecting columns are both about 319 kPa [=(0+637)/2], wherein the pressure at the pressure equalizing/raising side is slightly lower because the equalizing time is quite short in practice.

After the pressure equalizing process is finished, the valves 21, 25 and 26 for pressure equalization are closed and the valve 18 is opened to release the gas remaining in the adsorbing column 11 to the atmosphere to perform a regeneration step. Meanwhile, in the adsorbing column 12, the valve 19 is opened and the raw air compressed by the air compressor 13 is supplied to raise the pressure to a predetermined adsorption pressure after the pressure therein is raised relatively in the aforementioned pressure-equalizing step. Moreover, when the process switches from the pressurized state with the air being supplied into the adsorbing column to the state of collecting the nitrogen product, the valve 23 or 24 is opened at the moment that the pressure inside the adsorbing column exceeds that inside the product tank 29. In addition, when the air is being supplied to the adsorbing column, the pressure inside the adsorbing column generally tends to increase continuously until the end of the adsorption step since the air is supplied continuously from the pressurizing operation to the end of the adsorption step.

In the PSA process, the cycle time is an important operating parameter and is selected referring to the oxygen adsorption rate of the used CMS. That is, when the oxygen adsorption rate is high, a short cycle time is suitably selected; if the oxygen adsorption rate is low, a long cycle time is used for adsorbing sufficient oxygen. However, the amount of the adsorbed nitrogen that should be the product is also increased at the same time, so the recovery ratio of the product might be lowered.

Next, the performance of the nitrogen PSA apparatus is specified by the factors such as the filled amount of the necessary CMS adsorbent [kg], the rates of air supply [Nm$^3$/h] and nitrogen collection [Nm$^3$/h], etc. For a nitrogen PSA apparatus, a good performance means that more nitrogen can be obtained with a smaller amount of the filled adsorbent and therefore a smaller amount of air supply is needed. If the conditions of the PSA operation (the pressures of the adsorption step and the regeneration step, and the cycle time used in the PSA process) are constant, the nitrogen PSA apparatus has the characteristics described below. When a larger amount of product is collected, lower nitrogen purity is obtained correspondingly, which means that more oxygen is contained as the impurity. On the contrary, when the collected amount of the nitrogen product is decreased, the purity of the nitrogen product is raised correspondingly, which means that less oxygen is contained as the impurity.

Here, when a nitrogen product is collected with a rate of $QN_2$[Nm$^3$/h] and a purity of 99%, the nitrogen recovery ratio $\eta$ [%] is expressed by the equation below with the supply rate $Q_{Air}$ [Nm$^3$/h] of the raw air:

$$\eta=[(QN_2 \times 0.99)/(Q_{Air} \times 0.79)] \times 100$$

Though the air also contains argon (Ar) of about 1% in total volume, argon is considered the same as nitrogen since argon is also an inert gas. It can be understood from the equation above that an increased nitrogen recovery ratio $\eta$ [%] corresponds to a reduced consumption of the raw air, which means that less power is required for compressing the raw air.

If the CMS filled into the adsorbing column has a weight of W [ton], the nitrogen production rate per unit adsorbent weight is expressed by the equation:

$$w0=QN_2/W$$

Accordingly, when the nitrogen production rate per unit adsorbent weight (w0) is higher, the adsorbent amount (W) needed for producing nitrogen in a constant rate ($QN_2$) is smaller. Therefore, the size of the adsorbing column can be reduced and cost of the adsorbent can be decreased. Moreover, the adsorbent weight having a unit of "ton" can also be used to calculate the volume [m$^3$] needed for filling necessary adsorbent with a given filling density [kg/m$^3$] of the adsorbent. This is just a unit conversion problem.

As described above, when the PSA operating conditions (the pressures of the adsorption step and the regeneration step, and the cycle time) are constant, the nitrogen PSA apparatus has the characteristics described below. When a larger amount of product is collected, lower nitrogen purity is obtained correspondingly, which means that more oxygen is contained as the impurity. On the contrary, when the collected amount of the nitrogen product is decreased, the purity of the nitrogen product is raised correspondingly (less oxygen is contained as the impurity) and stabilized. Generally, if a CMS having good performance is used, a nitrogen gas product can be obtained with required purity or a required production rate with a smaller amount of filled CMS (in the design of the apparatus, the filled amount of CMS is determined according to the required nitrogen purity and the required nitrogen production rate). That is, if the performance of the CMS used in PSA nitrogen production is specified, the purity of the nitrogen product and the obtained production rate are determined. That is to say, if the CMS described in this invention is used to separate a nitrogen-rich gas with a PSA method, the nitrogen production rate per unit adsorbent weight is remarkably larger as compared with the CMS used in the prior art.

Next, when a nitrogen-rich gas is separated from the air with the nitrogen PSA apparatus using a CMS of this invention, the nitrogen production rates per unit adsorbent weight corresponding to oxygen concentrations of 100 ppm, 1000 ppm and 10000 ppm, respectively, are measured. The nitrogen production rates per unit adsorbent weight is defined as (the capability of producing nitrogen product of the apparatus [$Nm^3/h$])/(the amount of the filled adsorbent [ton]).

The nitrogen production rate per unit adsorbent weight provides the correlation between the scale of the adsorbing column (specifically, the required amount of the filled adsorbent) of the nitrogen PSA apparatus using the adsorbent of this invention and the amount of the nitrogen-rich gas obtained from the apparatus.

EXAMPLE 1

In Example 1, the six kinds of CMS adsorbents, CMS-A, CMS-B, CMS-C, CMD-D, CMS-E and CMS-F, having different times for adsorbing an amount of 50% of the adsorbed amount at equilibrium as shown in Table 1 are used in the nitrogen PSA apparatus illustrated in FIG. 2. The experimental conditions are as follows:

<Conditions of PSA Process>

Adsorption pressure: pressure at the end of the adsorption step: 637 kPa (gauge)

Half cycle time:

CMS-A: 120 (seconds), CMS-B: 120 s, CMS-C: 120 s

CMS-D: 90 s CMS-E: 90 s CMS-F: 90 s

PSA process: air pressurization adsorption equalization/depressurization depressurization regeneration purging regeneration equalization/pressurization. When the half cycle time is 90 seconds, for example: from air pressurization to adsorption: 85 seconds equalization/depressurization: 5 seconds from depressurization regeneration to purging regeneration: 85 seconds equalization/pressurization: 5 seconds The processing time from air pressurization to equalization/depressurization and that from depressurization regeneration to equalization/pressurization both are equal to the half cycle time.

Amount of used adsorbent: 16 kg (filled amount in one column)

Volume of the adsorbing column: 23.7 liter

The experiments are conducted under the aforementioned operating conditions, wherein a suitable half cycle time is selected for each kind of adsorbent. For each kind of adsorbent, the nitrogen recovery ratio η[%] and the unit collection rate w0 [$Nm^3/h/ton$] (w0 (nitrogen production rate)/(amount of adsorbent filled in one column)) that indicates the performance of the PSA process are listed in Table 2.

The results in Tables 1 & 2 obviously implies that the CMS that adsorbs an oxygen amount of 50% of the saturated oxygen adsorption amount with a period TO shorter than 10 seconds can make a higher collection rate in the PSA process. The adsorbents CMS-C, D, E & F, which have adsorption times TO from 5.8s to 9.6s as shown in Table 1, all have relatively higher collection rates. That is, the adsorbents CMS-C, D, E & F that have adsorption times (TO) for adsorbing 50% of the saturated oxygen adsorption amount shorter than 10 seconds have collection rates about 20% higher than those of CMS-A & B that have adsorption times (TO) longer than 10 seconds. That is, the performance variation of the nitrogen PSA apparatus is obviously large with only a variation of 1~2 seconds in the adsorption time "TO" needed for 50% of the saturated adsorption amount. Therefore, it is confirmed that the time "TO" needed to adsorb an oxygen amount of 50% of the saturated oxygen adsorption amount is preferably 5~10 seconds.

On the other hand, by analyzing the nitrogen recovery ratios η that indicate the performances of the PSA nitrogen-producing method, it is understood that CMS-D & F have smaller nitrogen recovery ratios as compared with CMS-A, B, C and E. Meanwhile, by comparing the ratios (separating ratios) "TN/TO" of CMS-D & F with those of CMS-A, B, C and E, as shown in Table 1, it is noted that the "TN/TO" ratio is either lower than 41 or higher than 41, and a boundary is thus confirmed, wherein TN is the time needed to adsorb 50% of the saturated nitrogen adsorption amount, and TO is the time needed to adsorb 50% of the saturated oxygen adsorption amount.

The adsorption pressure used in the PSA operation can be selected arbitrarily. Therefore, with the aforementioned PSA operation, the nitrogen-producing rate $QN_2$ varies with the used adsorption pressure. Accordingly, one feature of this invention is that the nitrogen-producing rate is specified by the operating conditions based on Example 1. That is, by using CMS-C & E having specified adsorption times (TO) for adsorbing 50% of the oxygen adsorption amount at equilibrium and specified separating ratios (TN/TO), the nitrogen product can be collected more efficiently with a nitrogen-producing rate is higher than 100 $Nm^3/h$, 150 $Nm^3/h$, or 250 $Nm^3/h$ with one ton of adsorbent as the oxygen concentration is 100 ppm, 1000 ppm, or 10000 ppm. The lower limits are for the adsorbent CMS-C having a lower collection rate among the two (CMS-C and CMS-E) having specified adsorption times TO for adsorbing 50% of the oxygen adsorption amount at equilibrium and specified separating ratios (TN/TO). Besides, this invention is not only restricted to use the operating conditions in the aforementioned sample, but also allows some modifications of the general PSA operating conditions.

EXAMPLE 2

Next, in Example 2, a nitrogen-rich gas is separated from the raw air with the nitrogen PSA apparatus using the six

TABLE 2

| Purity of nitrogen product | CMS-A | | CMS-B | | CMS-C | | CMS-D | | CMS-E | | CMS-F | |
|---|---|---|---|---|---|---|---|---|---|---|---|---|
| | η | W0 | η | w0 | η | w0 | η | w0 | η | W0 | η | w0 |
| 99% | 53 | 185 | 53 | 210 | 57 | 250 | 52 | 260 | 55 | 300 | 50 | 277 |
| 99.9% | 41 | 115 | 40 | 130 | 46 | 150 | 40 | 160 | 44 | 180 | 38 | 173 |
| 99.99% | 34 | 65 | 30 | 85 | 35 | 107 | 29 | 100 | 33 | 116 | 29 | 116 |

η nitrogen recovery ratio
w0: nitrogen collection rate per unit adsorbent weight kinds of CMS (CMS-A, B, C, D, E and F). The air processing rates per unit adsorbent weight [Nm³/h/ton] (=(raw air processing ability of the apparatus [Nm³/h])/(adsorbent filling amount [ton])) are obtained when the oxygen concentration in the nitrogen product are 100 ppn, 1000 ppm and 10000 ppm, respectively. The air-processing rate per unit adsorbent weight specifies the correlation between the air-processing rate and the adsorbent amount required for obtaining a nitrogen-rich gas.

As described above, the nitrogen recovery ratio is an important property of the nitrogen PSA apparatus, and the nitrogen recovery ratio of the nitrogen PSA apparatus is determined by the characteristics of the CMS used. The air-processing rate per unit adsorbent weight [Nm³/h/ton] is expressed by the equation with the nitrogen recovery ratio:

air-processing rate per unit adsorbent weight [Nm³/h/ton]=(flow rate of nitrogen product×nitrogen percentage)/(nitrogen recovery ratio×0.79×amount of filled adsorbent)

Now, for the six kinds of adsorbents mentioned above, the results of Example 1 are substituted into the equation above to obtain the air-processing rate per unit adsorbent weight, wherein the nitrogen PSA apparatus illustrated in FIG. 2 is used to perform experiments in Example 1. The results are listed in Table 3. In addition, the weight of the filled adsorbent is one ton.

TABLE 3

| Purity of nitrogen gas product | Air-processing rate (Nm³/h/ton) | | | | | |
|---|---|---|---|---|---|---|
| | CMS-A | CMS-B | CMS-C | CMS-D | CMS-E | CMS-F |
| 99% | 437 | 497 | 550 | 627 | 684 | 694 |
| 99.9% | 355 | 411 | 412 | 506 | 517 | 576 |
| 99.99% | 242 | 359 | 387 | 436 | 445 | 506 |

From the results in Table 3, the following operating conditions are confirmed to be preferable:

When the oxygen concentration in the collected nitrogen product is 100 ppm (nitrogen purity=99.99%), the adsorbent CMS-F has an air processing rate higher than 500 [Nm³/h/ton], which is much higher than those of the other adsorbents. CMS-A, B, C, D and E have lower air-processing rates approximately under 450 [Nm³/h/ton].

A good performance of the adsorbent means that more air can be processed and more nitrogen can be collected. In consideration of this, when the oxygen concentration is 100 ppm and CMS-D, for example, is taken as a standard, the adsorbents making higher product collecting rates are CMS-C, E and F. On the other hand, with the air-processing rate of CMS-D as a base value, the air-processing rates of CMS-C and E are 11% lower and +2% higher, respectively, while that of CMS-F is +16% higher. Therefore, when the oxygen concentration is 100 ppm, the preferable adsorbents are CMS-C, D & E.

When the oxygen concentration in the collected nitrogen product is 1000 ppm (nitrogen purity=99.9%), the adsorbent CMS-F has an air processing rate higher than 570 [Nm³/h/ton], which is remarkably higher than those of the other adsorbents. CMS-A, B, C, D and E have lower air-processing rates under 520 [Nm³/h/ton].

Analogously, when the nitrogen concentration is 1000 ppm and CMS-D, for example, is taken as a standard, the adsorbents making higher nitrogen-producing rates are CMS-E and F. The air-processing rate of CMS-E is +2% higher, while that of CMS-F is +14% higher. On the other hand, the product-collecting rate of CMS-C is 6% lower and its air-processing rate is 19% lower, which indicates a better efficiency in product collection. Therefore, when the oxygen concentration is 1000 ppm, the preferable adsorbents are CMS-C, D & E.

When the oxygen concentration in the collected nitrogen gas product is 10000 ppm (nitrogen purity=99%), the air processing rates of all adsorbents are dispersive and the differentiation is difficult to make with only the data of the air processing rates.

Analogously, CMS-D are taken as a standard, the adsorbents that have nitrogen-collecting rates higher than that of CMS-D are CMS-E and F. However, the nitrogen-collecting rate of CMS-E is increased by +15% with only an increase of +9% in the air processing rate, while the nitrogen-collecting rate of CMS-F is increased by only +7% even though the air processing rate is increased by +11%. For CMS-C, the nitrogen-collecting rate is −4% lower but the air-processing rate is −12% lower, which indicates a better efficiency in product collection. Therefore, when the oxygen concentration is 10000 ppm, the preferable adsorbents are CMS-C, D & E.

The comparison made above is an example that uses CMS-D as a standard, so CMS-C, D & E are considered superior at any nitrogen purity. However, if CMS-E is taken as the standard, the air-processing rate variations of CMS-D are −8%, −2% and −2%, and the nitrogen-collecting rate variations are −13%, −11% and −14% as the nitrogen purity is 99%, 99.9% and 99.99%, respectively, which means that the efficiency of nitrogen recovery is remarkably lower. On the contrary, with CMS-E as a standard, the air-processing rate variations of CMS-C are −20%, −20% and −13%, and the nitrogen-collecting rate variations are −17%, −17% and −8% as the nitrogen purity is 99%, 99.9% and 99.99%, respectively, which means that the efficiency in nitrogen collection is higher. Therefore, the preferable adsorbents are CMS-C and E. Moreover, the ratio TN (for $N_2$)/TO (for $O_2$) suitably serves as the indicator of the property of the adsorbent relating with the air-processing rate since CMS-F that has a sufficiently small TO value (i.e., a sufficient adsorption rate) but an insufficient ratio of TN to TO, as shown in Table 1, is not good in the results of PSA evaluation shown in Tables 2 & 3. Accordingly, the air-processing rates of CMS-F, 500 Nm³/h/ton, 570 Nm³/h/ton and 690 Nm³/h/ton, are taken as the upper limits as the oxygen concentrations are 100 ppm, 1000 ppm and 10000 ppm, respectively.

Moreover, when the adsorbent of this invention is used, PSA performance can be obtained with the numerical limits described above as the oxygen concentrations in nitrogen are 100 ppm, 1000 ppm, or 10000 ppm. However, for commercial apparatuses, a single apparatus is not used to produce nitrogen products of various concentrations and is constituted so that the specific concentration required by the customers can be generated. Therefore, by comparing the specified concentration and those claimed in this invention, the concentration condition of the nitrogen product produced by the commercial apparatus conflicts with the restricted range of this invention. Besides, in the domains of intermediate concentration, the process conditions are derived by connecting the two points at 100 ppm and 1000 ppm, respectively, with a line and by connecting the two points at 1000 ppm and 10000 ppm, respectively, with a line, and using an interpolation method.

As described above, this invention uses a carbon molecular sieve (CMS) that selectively adsorbs oxygen in an apparatus producing nitrogen from the air. The CMS is characterized in that the time "TO" needed for adsorbing an oxygen amount of 50% of the saturated adsorption amount is 5~10 seconds and the time "TN" needed for adsorbing a nitrogen amount of 50% of the saturated adsorption amount is larger than "TO" by more than 41 times, so the performance of the producing apparatus can be improved. Therefore, the properties of the CMS required for collecting nitrogen more effectively with the PSA method can be obtained with the adequate indication of the aforementioned indicators (TO and TN/TO).

Moreover, by using the CMS adsorbents having the property index mentioned above, the nitrogen-producing rate corresponding to the oxygen impurity concentrations of 100 ppm, 1000 ppm, and 10000 ppm are raised higher than 100 Nm$^3$/h, 150 Nm$^3$/h, and 250 Nm$^3$/h, respectively. Therefore, the nitrogen collection can be more effective with the recovery ratio being increased higher than 55%, 44% or 33% when the nitrogen purity is 99%, 99.9% or 99.99%.

Furthermore, by using the CMS adsorbents having the aforementioned property index of this invention, the feasible processing capacity of the operation can be effectively increased and nitrogen production can be conducted with better operating effects, and the apparatus can be further miniaturized (compactified). Meanwhile, the adsorbent properties effective for achieving a high product purity (>99.999%) can be discovered.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for producing nitrogen using a pressure swing adsorption (PSA) method with air as a raw material, comprising:

having the air contact with an adsorbent that comprises a carbon molecular sieve selectively adsorbing oxygen to produce nitrogen with a purity ranging from 99% to 99.999% by using the pressure swing adsorption (PSA) method that conducts regeneration of the adsorbent under atmospheric pressure, wherein a period "TO" needed for the carbon molecular sieve to adsorb an oxygen amount of 50% of a saturated oxygen adsorption amount starting from the beginning of oxygen supply is 5~10 seconds, and a period "TN" needed for the carbon molecular sieve to adsorb a nitrogen amount of 50% of a saturated nitrogen adsorption amount starting from the beginning of nitrogen supply is larger than "TO" by more than 41 times.

2. The method of claim 1, wherein a production rate of the nitrogen product with one ton of adsorbent is higher than 100 Nm$^3$/h as an oxygen concentration in the nitrogen product is 100 ppm, higher than 150 Nm$^3$/h as the oxygen concentration is 1000 ppm, or higher than 250 Nm$^3$/h as the oxygen concentration is 10000 ppm, wherein the oxygen concentration serves as a purity indicator of the nitrogen product.

3. The method of claim 1, wherein a processing rate of the air with one ton of adsorbent is less than 500 Nm$^3$/h as an oxygen concentration in the nitrogen product is 100 ppm, less than 570 Nm$^3$/h as the oxygen concentration is 1000 ppm, or less than 690 Nm$^3$/h as the oxygen concentration is 10000 ppm, wherein the oxygen concentration serves as a purity indicator of the nitrogen product.

4. An apparatus for producing nitrogen with a purity ranging from 99% to 99,999% using air as a raw material, comprising:

an air compressor for compressing the air;

a dryer for removing water from the compressed air;

at least one adsorbing column into which the dried and compressed air is conducted, the adsorbing column being filled with an adsorbent that selectively adsorbs oxygen; and a product tank for temporarily storing a nitrogen product conduct out of the adsorbing column after oxygen is removed in the adsorbing column, wherein in said at least one adsorbing column, an adsorption step and a depressurization regeneration step are switched alternatively and periodically to implement a pressure swing adsorption (PSA) process, wherein the adsorption step comprises conducting a raw air compressively into the adsorbing column, and the depressurization regeneration step comprises releasing a compressed gas under atmospheric pressure after the adsorption step; and the adsorbent is a carbon molecular sieve that selectively adsorbs oxygen, which adsorbs an oxygen amount of 50% of a saturated oxygen adsorption amount with a period "TO" of 5~10 seconds starting from the beginning of oxygen supply, and adsorbs a nitrogen amount of 50% of a saturated nitrogen adsorption amount with a period "TN" starting from the beginning of nitrogen supply, wherein TN is larger than TO by more than 41 times.

* * * * *